United States Patent
Akiyama et al.

(10) Patent No.: US 6,560,024 B2
(45) Date of Patent: May 6, 2003

(54) SCAN HEAD, AN APPEARANCE INSPECTION METHOD AND AN APPEARANCE INSPECTION APPARATUS USING THE SAME

(75) Inventors: Yoshihiro Akiyama, Kanagawa (JP); Yukio Iwano, Kanagawa (JP)

(73) Assignee: Saki Corporation, Kawasaki (JP)

( * ) Notice: Subject to any disclaimer, the term of this patent is extended or adjusted under 35 U.S.C. 154(b) by 127 days.

(21) Appl. No.: 09/790,671

(22) Filed: Feb. 23, 2001

(65) Prior Publication Data

US 2002/0021496 A1 Feb. 21, 2002

(30) Foreign Application Priority Data

Aug. 11, 2000 (JP) ........................................ 2000-244686

(51) Int. Cl.[7] ............................................... G02B 27/10
(52) U.S. Cl. ...................................................... 359/619
(58) Field of Search ................................ 359/619, 205; 358/474, 475; 355/22

(56) References Cited

U.S. PATENT DOCUMENTS 5,192,969 A * 3/1993 Igarashi et al. ................ 352/58
5,479,270 A * 12/1995 Taylor ........................... 355/22
5,696,596 A * 12/1997 Taniguchi ..................... 347/112
5,786,902 A * 7/1998 Morton .......................... 355/77

FOREIGN PATENT DOCUMENTS

JP          8254500       10/1996

OTHER PUBLICATIONS

English Abstract of Japanese Application JP8254500, esp@cenet database, Dec. 20, 2000.

* cited by examiner

Primary Examiner—Ricky Mack

(57) ABSTRACT

An appearance inspection apparatus for inspecting a surface of a printed circuit board requires high inspection accuracy and inspection time reduction. To this end, the apparatus has a scan head that scans an object under inspection and generates image data of the surface of the object. The scan head includes a vertical light source which projects light on the surface from right above the object and a side light source which projects light sidelong on the surface. A lenticular sheet is provided between the vertical light source and the object in order to adjust the vertical light and improve the inspection accuracy in a vertical light test. In a side light test, light sources other than the central part in the vertical light source is turned on and an auxiliary light is projected along with the side light, so that the dynamic range for the inspection can increase.

21 Claims, 12 Drawing Sheets

SCAN HEAD, AN APPEARANCE INSPECTION METHOD AND AN APPEARANCE INSPECTION APPARATUS USING THE SAME

BACKGROUND OF THE INVENTION

1. Field of the Invention

The present invention relates to a scan head and an appearance inspection technique, and it particularly relates to a scan head which scans an object under inspection and obtains information, and an appearance inspection method and apparatus which inspect the appearance of the object using the scan head.

2. Description of the Related Art

It is certain that Information Technology (IT) could define an aspect of the new hundreds in the twenty-first century as well as biotechnology. In the IT field, the product cycle is very short as symbolized as "dog year", and the speed of development and the cost reduction are more critical as ever and a key to the survival of enterprises.

The hardware to support such an IT boom can be categorized into the Internet as an infrastructure, and the information device such as personal computers, personal digital assistance (PDA) and a cellular phone. The latter, that is, various kinds of terminals have been explosively spread and used. It highly owes to downsizing and low price in manufacturing, which has been achieved by high integration design.

High density implementation technology is an element to realize the high integration design, as well as rich types of design tools and advancement in semiconductor technology. The main point in the high density implementation is in manufacturing and inspecting technique. Conventionally, In-Circuit Tester (ICT) has been used to inspect the print circuit board after electrical components are implemented. However, the contact-type inspection apparatus cannot deal with the high density in implementation, and non-contact type, particularly an appearance inspection apparatus using image recognition technique has been highly demanded.

The concept of applying image recognition technology to the appearance inspection is well known for ages. Considering the situation in which even a compact board has several hundreds to over a thousand of parts implemented, however, very high resolution, for example, order of 20 microns, is required for the image to be inspected. Thus it likely takes longer to inspect the board compared to implementing components, and it becomes a very large hamper in a severe competition in product developments.

Under the situations described above, the applicant of the present invention proposed an appearance inspection apparatus having a line sensor in Japanese Patent Application Laid-open No. H8-254500. The apparatus includes a vertical light source as well as a side light source which was common at that time, and switches between two light sources according to testing items. The point of the apparatus is described as follows.

FIG. 1 shows a substrate 1 that is an object under inspection. FIGS. 2A and 2B show the effect of side light 6a and vertical light 6b respectively. As shown in FIG. 2A, when the side light 6a is projected on a component 2, catoptric light 8a reflects sidelong from the horizontal surface of the component 2, but part of the catoptric light 8a reflects vertically upward from the slope where solder 4 is properly mounted. On the other hand, as shown in FIG. 2B, when the vertical light is projected on the component 2, catoptric light 8b reflects totally from the horizontal surface vertically upward, but it is not the case from the slope.

FIGS. 3A and 3B show the images of the substrate 1 under the side light 6a and the vertical light 6b respectively which are captured by a CCD sensor provided above the substrate 1. As shown in FIG. 3A, the image similar to a photograph copy is captured under the side light 6a, and it is comparatively easier to detect a solder bridge across the lead parts of the component, that is, the implementation defect which causes the solder to short-circuit the multiple leads, and a polarity mark on the component which indicates the position and the direction of the component. On the other hand, as shown in FIG. 3B, the high contrast image is captured under the vertical light 6b, and the edge part of the components and the slope part of the soldering appears black. Therefore, it is relatively easier to judge a shift in the location of the components, the absence of the component, and whether solder is properly attached to the electrodes or leads of the component.

As the demand for the appearance inspection apparatus grows increasingly, the inspection speed is still a general problem to be overcome in this field. As a matter of course, the requirement for the accuracy of the image recognition is becoming greater and greater.

SUMMARY OF THE INVENTION

The present invention has been made by the applicant in recognition of the above and an object thereof is to provide an appearance inspection technology which is able to meet inherently antinomy in requirements of processing speed and inspection accuracy, and component technology thereof. Another object of the present invention is to further improve the above-mentioned technology proposed by the applicant of the present invention.

An aspect of the present invention relates to a scan head. The scan head for scanning an object under inspection comprises a vertical light source which projects light on a surface of the object from right above, a line sensor which detects catoptric light that reflects vertically upward on the surface, and a lenticular sheet which is inserted between the vertical light source and the object and has a lens surface and a non-lens surface. The lenticular sheet is arranged in a manner such that the lens surface faces to the object and a direction of lens gouges in the lens surface and a scanning direction in the line sensor are nearly orthogonal. Herein, projecting light on the surface of the object from right above means projecting light at an almost zero incident angle onto the surface under inspection. The catoptric light that reflects vertically upward on the surface means light reflected at an almost zero reflection angle from the surface. Namely, the vertical light and the catoptric light pass along almost the same optical axis. Note that strictly speaking, the words of vertical light strictly means the light projected at a zero incident angle, but in this specification the vertical light may have a width from the zero incident angle at a certain degree according to the actual situation of the apparatus.

For instance, the vertical light source may be in a one-dimensional shape and placed in parallel to the line sensor. The line sensor may be a CCD sensor or any other image capturing sensors. The scanning direction in the line sensor means the direction along the long side of the sensor and it is generally orthogonal to the direction of the relative movement of the sensor and the surface under inspection. In the following, the direction of the relative movement is also referred to as a driving direction in this specification and it is discriminated from the scanning direction. The lens used in the lenticular sheet may be in general a cylindrical lens, but any equivalent thereof can be used as long as it has a similar effect in the present invention.

In this aspect of the present invention, it is possible that the light from the vertical light source refracts in the lens surface of the lenticular sheet and the light component vertical to the surface under inspection is stronger than other components. Consequently, the inspection under the vertical light can be performed more accurately.

The lenticular sheet may have a shade material with a line shape attached to the non-lens surface, the shade material being in a position at an opposite side corresponding to each of the lens gouges. In this case, as described later, the lenticular sheet works in a manner such that it can block off light components other than the light vertical to the surface under inspection. Therefore it can contribute to the improvement in the inspection accuracy under the vertical light.

Another aspect of the present invention also relates to a scan head. The scan head has a different configuration in the non-lens surface. Namely, the non-lens surface has a shade material which functions as a slit for incident light to restrain a diffusion of light projected on the object. The same effect stated above can be obtained in this case.

Still another aspect of the present invention also relates to a scan head. In this aspect of the present invention, the lenticular sheet has a lens structure on both surfaces. The main lens surface is configured in a manner such that the main lens surface faces to the object and a direction of lens gouges in the main lens surface and a scanning direction in the line sensor are nearly orthogonal. On the other hand, the sub lens surface faces to the vertical light source and is so configured that each of lens forming the sub lens surface is in a position at an opposite side corresponding to each of lens forming the main lens surface. Furthermore, the sub lens surface has a shade material with a line shape attached to a lens boundary at an opposite side corresponding to each of the lens gouges in the main lens surface. According to this configuration, the above-mentioned effect further increases in general, as described later in an embodiment.

Still another aspect of the present invention relates to an appearance inspection apparatus. The apparatus comprises a scan head which scans the object, and a main unit which synthetically controls the apparatus including the scan head. The scan head includes a vertical light source, and a line sensor which detects catoptric light that reflects vertically upward on the surface and generates image data; and a lenticular sheet stated above or similar. On the other hand, the main unit includes a head control unit which controls a relative movement of the scan head and the object, and an analysis unit which judges on pass or failure for each of test items by examining the image data with predefined judgment criteria. According to this apparatus, a test using the vertical light, as also simply referred to as a vertical light test, can be performed effectively.

Still another aspect of the present invention relates to a scan head. The scan head comprises a line sensor which detects catoptric light that reflects vertically upward on a surface of the object, a vertical light source which is arranged with a predefined width vertically right above the surface along a scanning direction in the line sensor, and a side light source which is arranged sidelong above the surface along the scanning direction in the line sensor. The vertical light source is so configured that a first zone that passes through a central part of the width and a second zone excluding the first zone are enabled to turn on independently.

According to this configuration, it is possible that only the first zone or both of the first and the second zone are turned on in a vertical light test, while the second zone is turned on as auxiliary light in a test using the side light, which is also simply referred to as a side light test.

The first zone may be an ideal region in a vertical light test where an intension of the catoptric light by lighting from the first zone is within close to maximum. The image to be obtained under the vertical light is an image by the catoptric light with high contrast. Since the line sensor is arranged in such a manner that it can detect catoptric light that reflects vertically upward on the surface under inspection, if the vertical light is also projected from vertically upward, an image with high contrast can be obtained. However, since the vertical light source has a width herein, although such a phenomenon appears under the projected light from the center, it is a phenomenon close to one under a side light that may be seen under the projected light from the edge. Therefore, the central part by which an image can be detected with high contrast is defined as the first zone, that is, the ideal region in the vertical light test. Thus conversely such a use arises that the second zone is turned on in the side light test to enhance the side light.

Further still another aspect of the present invention relates to an appearance inspection method. The method comprises selecting a first test mode, projecting vertical light on a surface of the object from a vertical light source which is arranged vertically right above the surface and scanning the surface line by line, detecting catoptric light that reflects vertically upward on the surface and generating image data of the surface line by line during the scanning in the first test mode, selecting a second test mode, projecting simultaneously side light from a side light source which is arranged sidelong above the surface, and auxiliary light provided by turning on a zone excluding a central part of the vertical light source and scanning the surface line by line in the second test mode, and detecting catoptric light that reflects vertically upward on the surface and generating image data of the surface line by line during the scanning in the second test mode.

For instance, the first test mode is the vertical light test, and the second test mode is the side light test. According to this aspect of the present invention, the accuracy in the side light test can increase under the auxiliary light. Furthermore, since the part of the vertical light source also serves as a source of the auxiliary light, cost merit and implementation merit can be obtained.

Moreover, any arbitrary combination of the above-mentioned structural components in the present invention is still effective as an embodiment when applied as a method, a system, and a computer program, and so forth.

Moreover, this summary of the invention does not necessarily describe all necessarily features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 4:
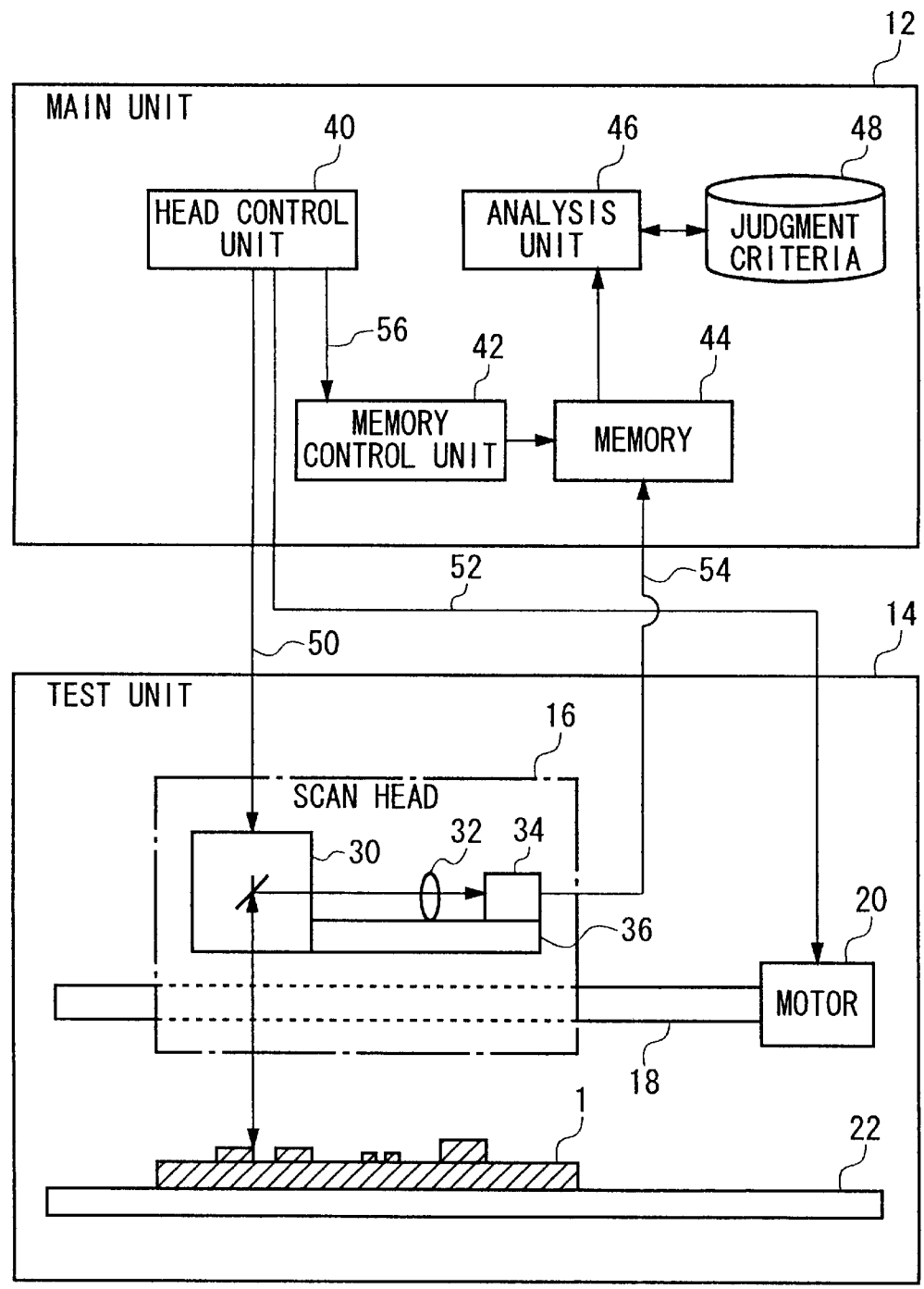
FIG. 4 is an overall block diagram of an appearance inspection apparatus according to an embodiment.

FIG. 4 shows a structure of an appearance inspection apparatus 10 according to an embodiment. The apparatus captures an image through scanning the surface of an object under inspection by a line sensor, and then determines pass or failure for the implementation condition of components mounted on the object by using image recognition. By driving a scan head in an orthogonal direction to the scanning direction of the line sensor, image data are sequentially captured line by line. The whole image of the surface is captured by the one-dimensional movement of the scan head. Another type of the appearance inspection apparatus moves the surface of the object in two dimensions and stops at a position, and then repeat the same action while it snapshots the image at each position. In this case, the mechanics of the apparatus is complex and takes a longer time for inspection. This embodiment using the line sensor is of great advantage to this regard.

As shown in FIG. 4, the appearance inspection apparatus 10 includes a main unit 12 and a test unit 14. The test unit 14 has a sustaining board 22 at the bottom, which holds a substrate 1. The upper part of the test unit 14 has a scan head 16, a stepping motor 20 which drives the scan head 16, and a guide 18 including a linear guide and others which sustains the scan head 16.

The scan head 16 includes a lighting unit 30, a lens 32 and a line sensor 34. These components are fixed on the frame 36. The lighting unit 30 includes a vertical light source, a side light source, a half mirror and others as described later. The catoptric light reflected vertically upward from the substrate 1 is directed to the lens 32 by the half mirror, and inputted to the line sensor 34 which is a one-dimensional CCD sensor. The line sensor 34 scans the substrate 1 line by line and outputs its image data 54.

A main unit 12 controls the apparatus as a whole synthetically. The main unit 12 can be implemented by CPU, memory and other LSI as a hardware and executed by a program having an appearance inspection function loaded into the memory, however the figure only illustrates functional blocks realized by the association of the hardware and software. Therefore, it is understood by the skilled person in the art that these functional blocks can be realized by hardware only, software only, or any combination thereof.

A head control unit 40 in the main unit 12 first outputs a light control signal 50 to the lighting unit 30 and activates different lighting conditions according to the contents of the tests. Furthermore, the head control unit 40 outputs a motor control signal 52 to a motor 20 and a test start signal 56 to a memory control unit 42, respectively. The test control signal 52 activates the stepping motion of the motor 20, and the scan head 16 moves to an end of the substrate 1 at the beginning of the inspection. This position is referred to as "a start position" in the following. Afterwards, the scan head 16 moves by one line according to the motor control signal 52, whenever it scans one line. On the other hand, the memory control unit 42 refers to the test start signal 56 and controls writing image data 54 to a memory 44, and thus the image data 54 is recorded line by line.

An analysis unit 46 retrieves the image data 54 in parallel with the scanning, or after the completion of the scanning, and then judges on pass or failure for each of the test items by referring to the judgment criteria stored beforehand in a judgment criteria storing unit 48. As the test items in the vertical light test, there are a shift in the location of components, the absence of components, wetting of solder, namely sufficiency in the amount of solder, and so on. As the test items in the side light test, there are a solder bridge, an incorrect component, inversion of a polarity mark, and so on. For instance, as for wetting of solder in the vertical light test, as explained later in FIG. 10, it can be determined as pass if a dark part appears uniformly around the electrode of the component, and as failure if a dark dot appears distant from the electrode. The latter case, it is very likely that the solder is not placed on the electrode but remains on the pad of the substrate 1 forming a low mountain without flowing. In any cases, the judgment criteria storing unit 48 stores beforehand judgment criteria or standard images for judging on pass or failure for the implementation conditions of each of components mounted on the substrate 1 under inspection. The judgment criteria or the standard images are applied to the actual image captured by the line sensor 34 and thereby the judgment is performed.

Figure 5:
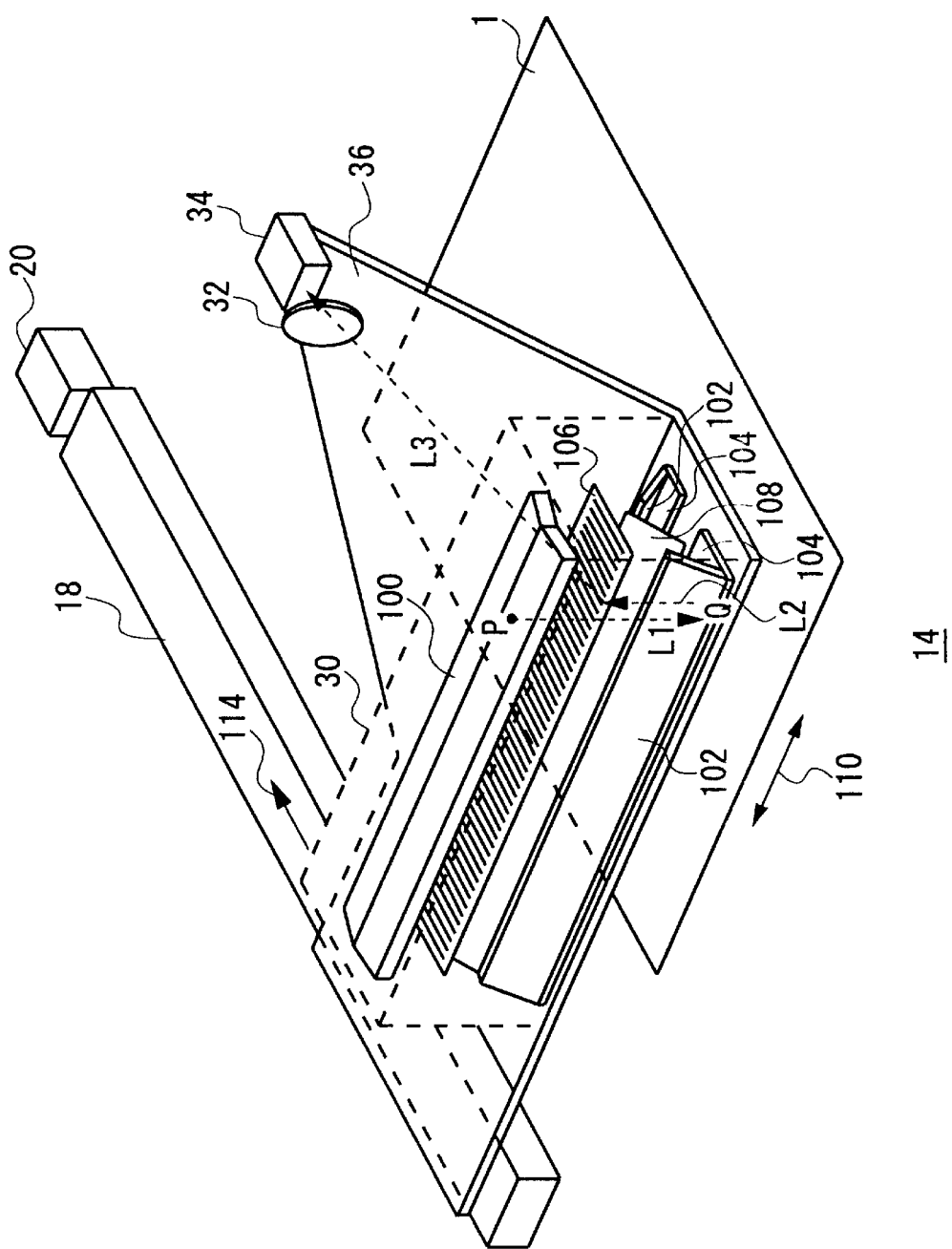
FIG. 5 is a perspective view of a test unit according to an embodiment.
Figure 6:
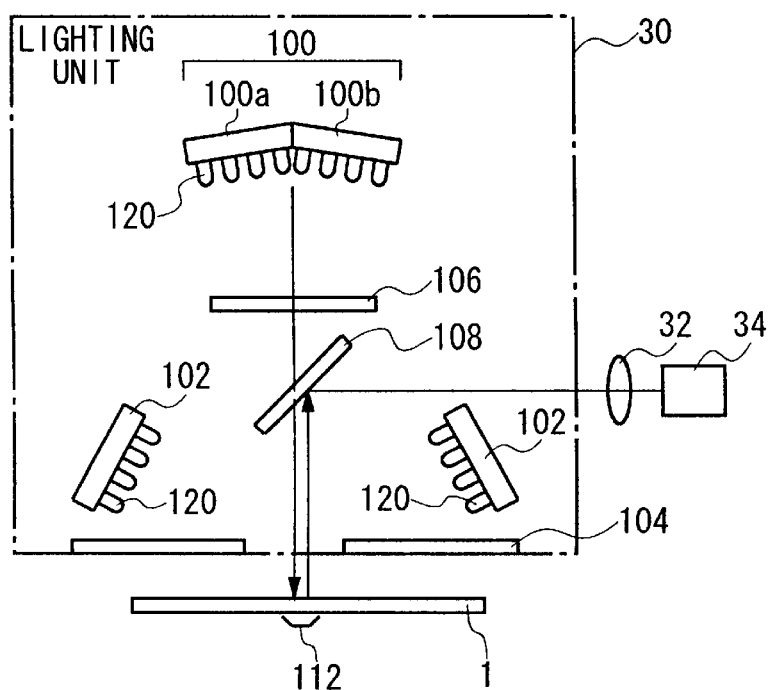
FIG. 6 is a schematic diagram of the test unit viewed from a scanning direction.

FIG. 5 is a perspective view of the test unit 14, and FIG. 6 is a schematic diagram of the test unit 14 viewed from the scanning direction 110. The lighting unit 30 includes a vertical light source 100 and a side light source 102, and these light sources surround a half mirror 108. A lenticular sheet 106 is inserted between the vertical light source 100 and the half mirror 108, and the vertical light goes through the lenticular sheet 106 and the half mirror 108, and is projected on the inspection surface of the substrate 1 with an incident angle at an almost zero degree. An acrylic sheet 104 is provided below the side light source 102. In this embodiment, the vertical light source 100 has a width so that there can exist a vertical light component with a zero incident angle even if the substrate 1 warps.

As shown in FIG. 6, the vertical light source 100 is divided into two sub-boards 100a and 100b, and each of them has three rows of LED (light emitting diode) series 120 arranged in the scanning direction 110. These sub-boards 100a and 100b are jointed together slightly facing with each other so that each of the LED series 120 can project the vertical light effectively on the line 112 under inspection. On the other hand, each of the two side light sources 102 has four rows of LED series 120, and the two side light sources 102 are at an angle so that they can project the side light effectively on the line 112, as it is the case with the vertical light source 100. The catoptric light from the line 112 reflects at the half mirror 108 and is directed to the lens 32. Referring to FIG. 5, the vertical light L1 from a point P inside the vertical light source 100 reflects around a point Q on the substrate 1. The catoptric light L2 reflects again at the half mirror 108 and the catoptric light L3 is directed to the lens 32. Note that the two rows of LED series 120 near the center and the other four rows of LED series 120 have separate power supplies which are not shown in the figure, so that each of them can be turned on and off independently.

The acrylic sheet 104 diffuses the side light from the side light source 102. The side light source 102 is a group of LEDs each of which is a point light source. Therefore it is concerned that without the diffusion effect, spotlight-like light could appear in the captured image data affecting the inspection accuracy. On the other hand, the lenticular sheet 106, as the significance thereof will be described in detail from FIG. 9 to FIG. 11, has an effect of narrowing down the vertical light into a vertical component to the substrate 1. Note that the diffusion effect on the vertical light is realized by the lenticular sheet 106.

After the image data of one line was captured in the situation shown in FIG. 5 or FIG. 6, the scan head 16 is forwarded by one line in the driving direction 114 along the guide 18. Afterward, the same process is repeated, and finally the image data of the whole surface of the substrate 1 is obtained.

Figure 7A:
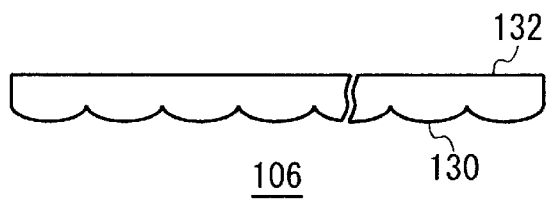
FIGS. 7A, 7B and 7C show a different type of a lenticular sheet built in a lighting unit respectively.
Figure 7B:
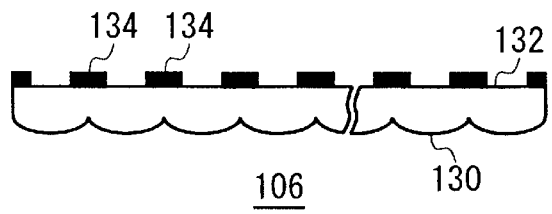
Figure 7C:
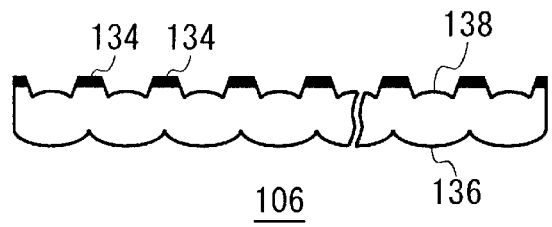

FIGS. 7A, 7B and 7C show different types of configuration of the lenticular sheet 106. In the example shown in FIG. 7A, the lenticular sheet 106 is held by the housing of the lighting unit 30, while its lens surface 130 faces to the substrate 1 and its non-lens surface 132 faces to the vertical light source 100. In this example, the lens surface 130 is a solid series of cylindrical lens, and the non-lens surface 132 is a plane or an equivalent surface thereof.

Another example shown in FIG. 7B is almost similar to the first one, but shade materials 134 are painted on the non-lens surface 132 forming a striped shape. The shade materials 134 are provided in the position corresponding to each gouge between lenses. This configuration is somewhat more effective in respect to adjusting the vertical light than that of FIG. 7A.

In the example shown in FIG. 7C, both surfaces of the lenticular sheet 106 form lenses, as its main lens surface 136 facing to the substrate 1 and its sub lens surface 138 facing to the vertical light source 100. The main lens surface 136 has lenses with somewhat larger cylinder bore than the sub lens surface 138. Each of the lenses on the main lens surface 136 corresponds to each of the lenses on the sub lens surface 138 one by one. Furthermore, the border of each lens on the sub lens surface 138 forms a bump toward the vertical light source 100, and a shade material 134 is painted on the bump. According to the experimental result by the applicant of the present invention, the example of FIG. 7C is the most effective in the vertical light arrangement, and has no significant problems in respect to the aperture ratio for the vertical light.

Note that a configuration equivalent to these lenticular sheets 106 is shown in Japanese Patent Application Laid-open H10-300909, but in this embodiment the lens surface or the main lens surface is provided in the downstream of the optical path in this embodiment, contrary to the configuration in said Japanese Patent Application Laid-open or other general configuration utilizing the lenticular lens.

Figure 8:
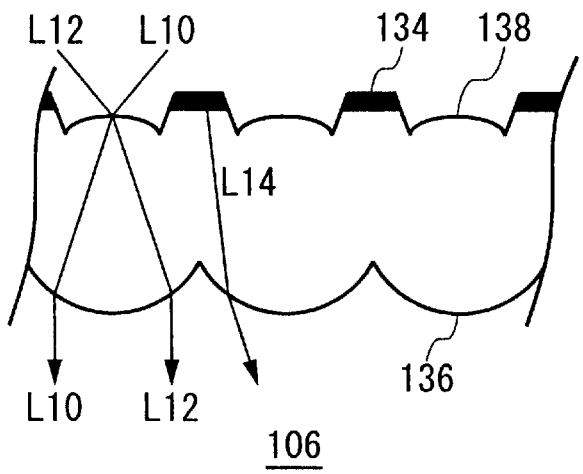
FIG. 8 shows an enlargement of a part of the lenticular sheet of FIG. 7C along with the optical path of vertical light.

FIG. 8 shows an enlargement of a part of the lenticular sheet 106 of FIG. 7C along with the optical path of the vertical light. The vertical light diffuses in various directions and includes light L10 and L12 that have a comparatively large incident angle to the sub lens surface 138. After the light L10 and L12 are refracted in the sub lens surface 138 and the main lens surface 136, the incident angle to the substrate 1 becomes close to zero as shown in the figure. On the other hand, the optical path of the light L14, the incident angle of which does not come to zero after the refraction in the lenticular sheet 106, is blocked off beforehand by the shade material 134.

Figure 9:
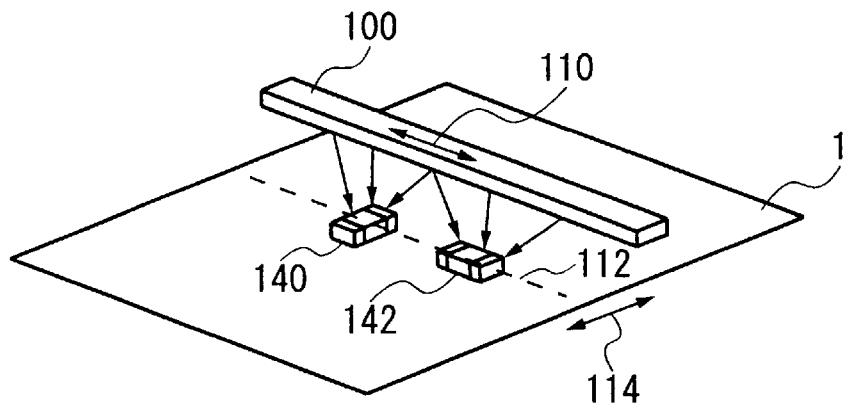
FIG. 9 explains a disadvantage without a lenticular sheet.

FIG. 9 explains a disadvantage without the lenticular sheet 106. Now focus on the vertical light source 100 and the substrate 1. It is only the light component projected on the line 112 under inspection among the vertical light from the vertical light source 100 that contributes to the formation of the image data. Therefore, according to this fact only, as for the driving direction 114, it can be assumed that the vertical light is projected almost vertically to the substrate 1. However the situation is different as for the scanning direction 110. Namely, as shown in the figure, as for the scanning direction 110, the light in any direction can reach the line 112, originating from any position in the vertical light source 100. In a nutshell, as for the scanning direction, the vertical light is not realized essentially.

Figure 10:
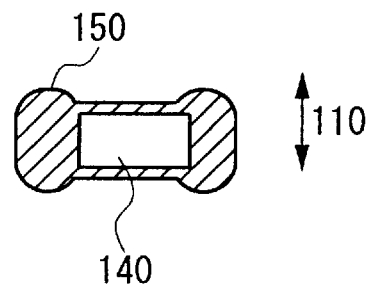
FIG. 10 illustrates an image of a component implemented along a driving direction.

Consider two chip components 140 and 142 implemented in different directions on the substrate 1. The first component 140 is mounted is such a manner that the direction connecting its both electrodes is orthogonal to the scanning direction 110. The second component 142 is mounted in such a manner that the direction connecting its both electrodes corresponds to the scanning direction 100. In the vertical light test, if the first component 140 is properly mounted, the catoptric light from the solder slope and the inclined parts of the component hardly reach the line sensor 34, and a dark image region 150 appears surrounding the first component 140 as shown in FIG. 10.

Figure 11:
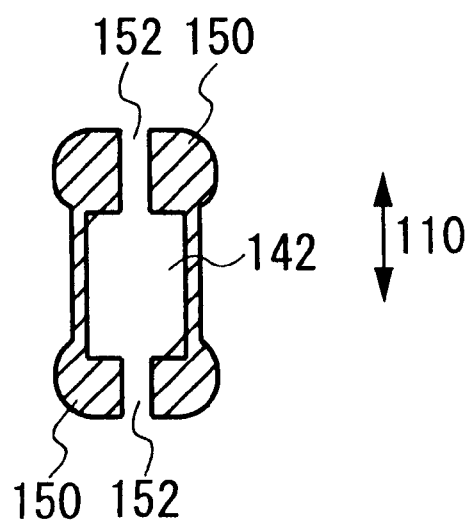
FIG. 11 illustrates an image of a component implemented along a scanning direction.

On the other hand, even if the second component 142 is properly mounted, the dark image region 150 surrounding the second component 142 is separated by a comparatively brighter region 152 as shown in FIG. 11, and it causes an obstruction to the judgment on pass or failure, as it is realized by the inventor. It is because the ideal vertical light is riot realized in the scanning direction 110 and the light from various directions coexists as stated above, so that even the solder slope and the inclined part of the component can reflect a sufficient amount of catoptric light to the line sensor 34. In other words, the vertical light source 100 can be printed in the brighter region 152 along its long side.

The embodiment applies the lenticular sheet 106 according to the observation stated above. By inserting the lenticular sheet 106 between the vertical light source 100 and the substrate 1 and adjusting the direction of the lens gouge to being almost orthogonal to the scanning direction 110, the problem shown in FIG. 11 can be resolved as a result of the optical path adjustment effect explained in FIG. 8. This fact has been confirmed with the experimental results.

Figure 12A:
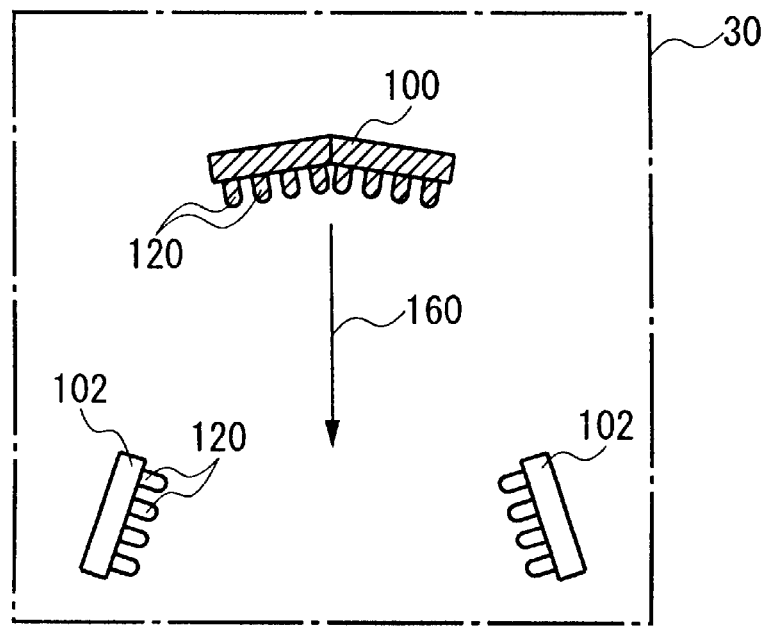
FIGS. 12A and 12B illustrate light sources to be turned on or off in a vertical light test and in a side light test respectively.
Figure 12B:
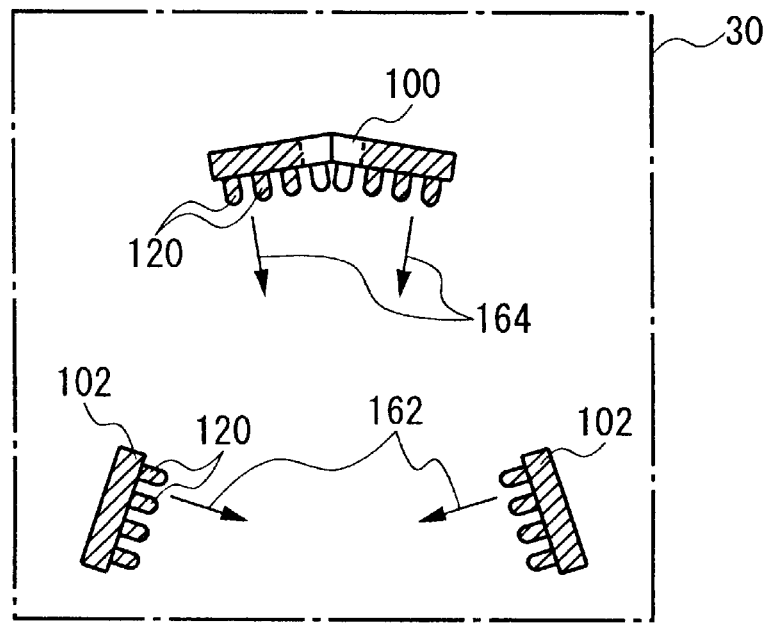

Another consideration in this embodiment is on the lighting intension. FIGS. 12A and 12B illustrate the LED series 120 indicated as the shaded portion, which are turned on in the vertical light test and in the side light test respectively. First, in the vertical light test, the whole vertical light 100 is turned on and the vertical light 160 is projected vertically on the substrate 1 from the right above. The vertical light source 100 has a width in the driving direction so that it can deal with the warp or flexion of the substrate 1.

Figure 1:
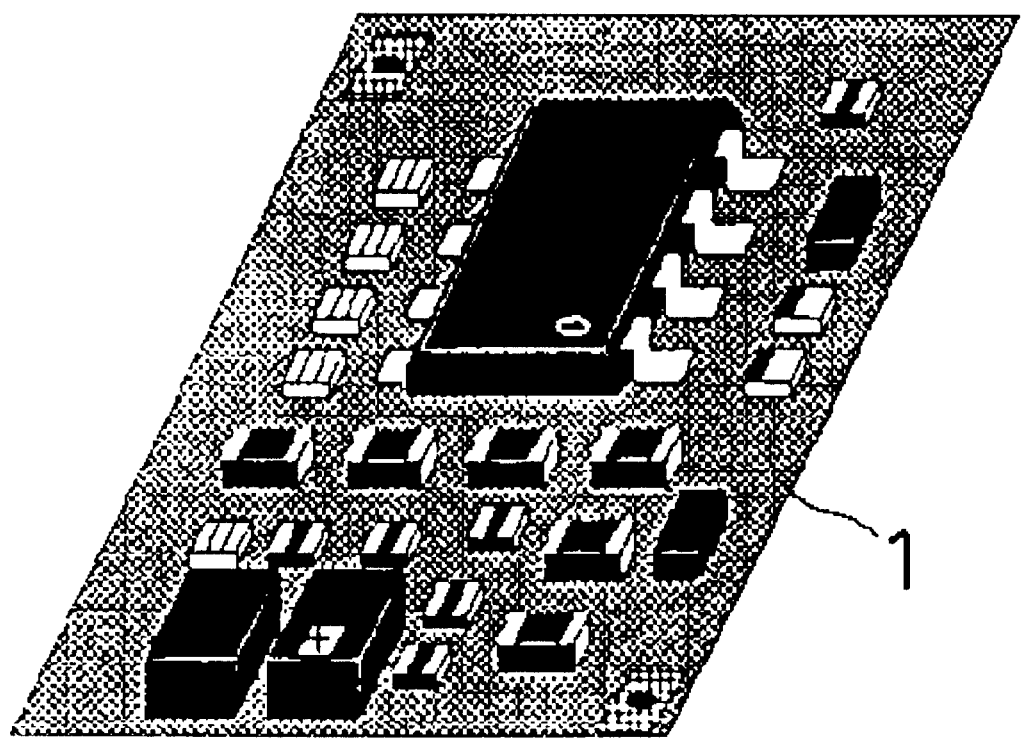
FIG. 1 shows a substrate as an example of an object under inspection.
Figure 2A:
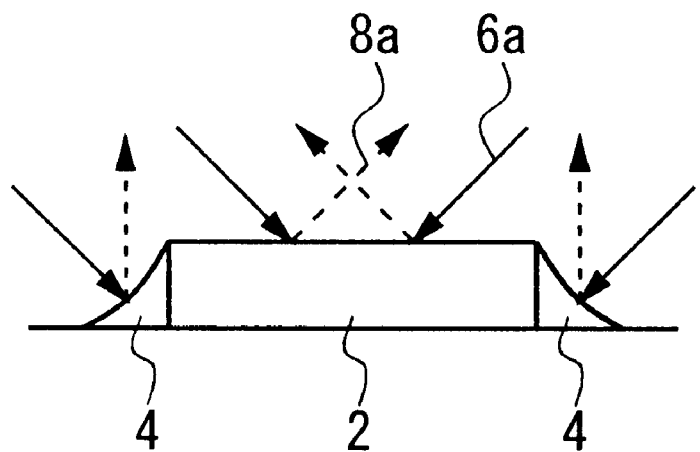
FIGS. 2A and 2B show an effect of side light and vertical light respectively.
Figure 2B:
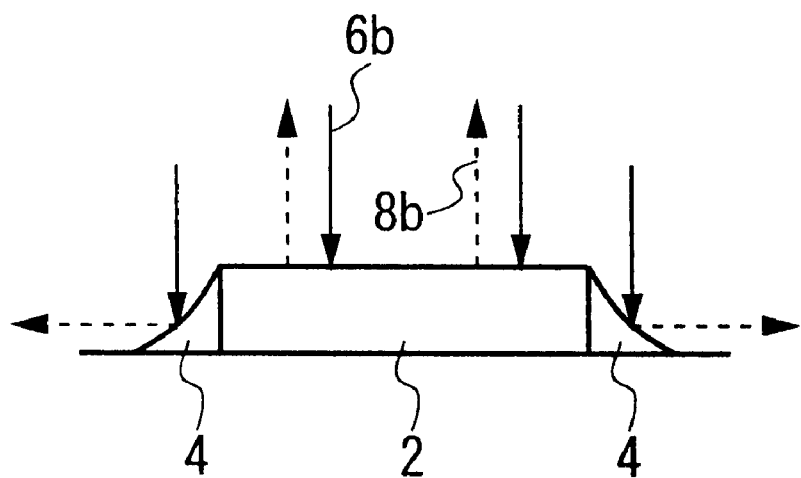
Figure 3A:
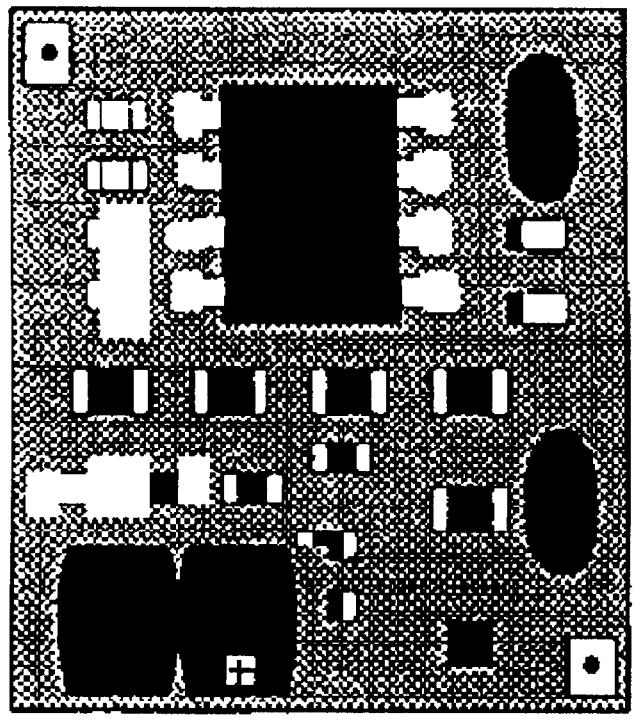
FIGS. 3A and 3B show an example of images obtained in a side light test and a vertical light test respectively.
Figure 3B:
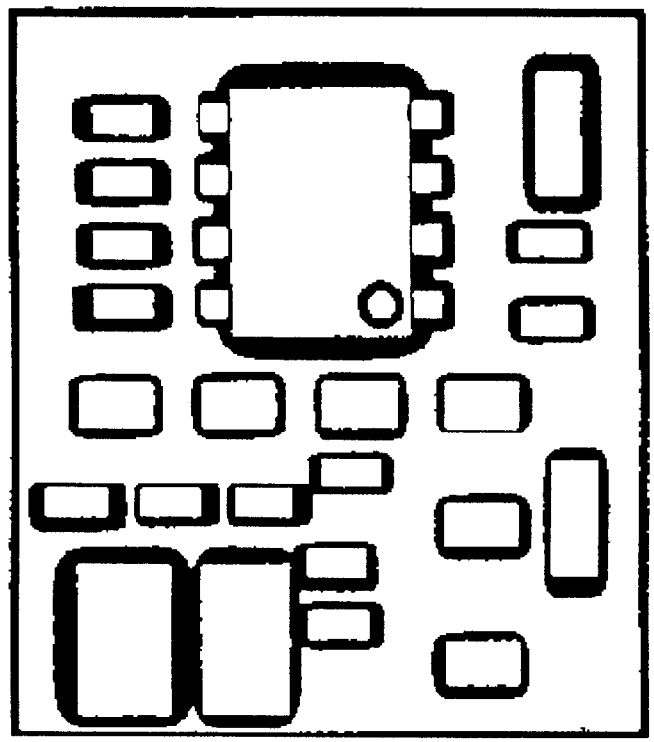

On the other hand, in the side light test, the whole side light source 102 is turned on and the side light 162 is projected down, and at the same time totally four rows of the outer LED series 120 in the vertical light source 100 is turned on and the auxiliary light 164 is projected. As understood from FIGS. 2A and 2B, if the vertical light source 100 and the side light source 102 have brightness at the same degree, the catoptric light 8a by the side light 6a is darker than the catoptric light 8b by the vertical light 6b. For the purpose of compensating for it, as shown in FIG. 12B, the central zone in the vertical light source 100, as also referred to the first zone below, is not turned on. It is because the light from the first zone is an almost ideal vertical light 160, and the image to be captured becomes similar to the image captured in the vertical light test despite the side light test, and as a result the test purpose is not achieved. Conversely, the first zone can be defined as a region that projects an ideal vertical light in the vertical light test. Note that since the auxiliary light 164 is projected at an angle different from the side light 162, an inherently desirable condition can be closely achieved in the side light test, namely the condition where the light is projected uniformly from the whole round of the camera unit.

Let the distance from the vertical light source 100 to the substrate 1 to be about 100 millimeter and the distance from lenticular sheet 106 to the substrate 1 to be about 70 millimeter. An experimental result shows that the first zone is within 2 to 3 degree from the right above the scanned line, although the result depends on the condition of the substrate 1 and other situations. In this embodiment, in order to get a sufficiently reliable result, the first zone is somewhat large enough and the two central rows of LED series 120 in the vertical light source 100 are turned off.

Figure 13:
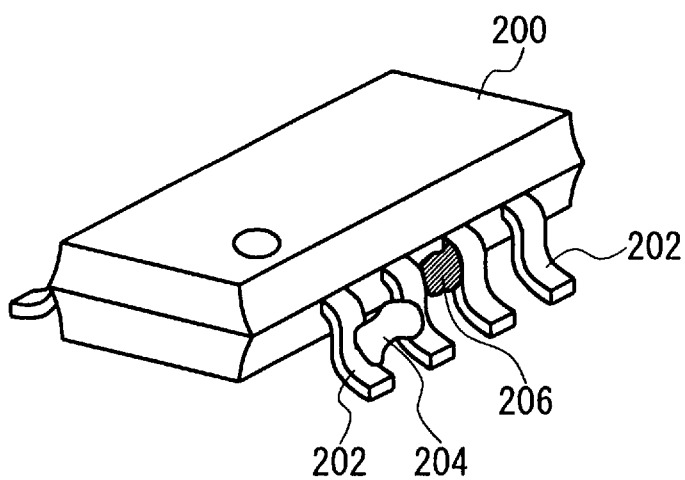
FIG. 13 is a perspective view of an IC implemented on a surface with a residual flux and a solder bridge.
Figure 14:
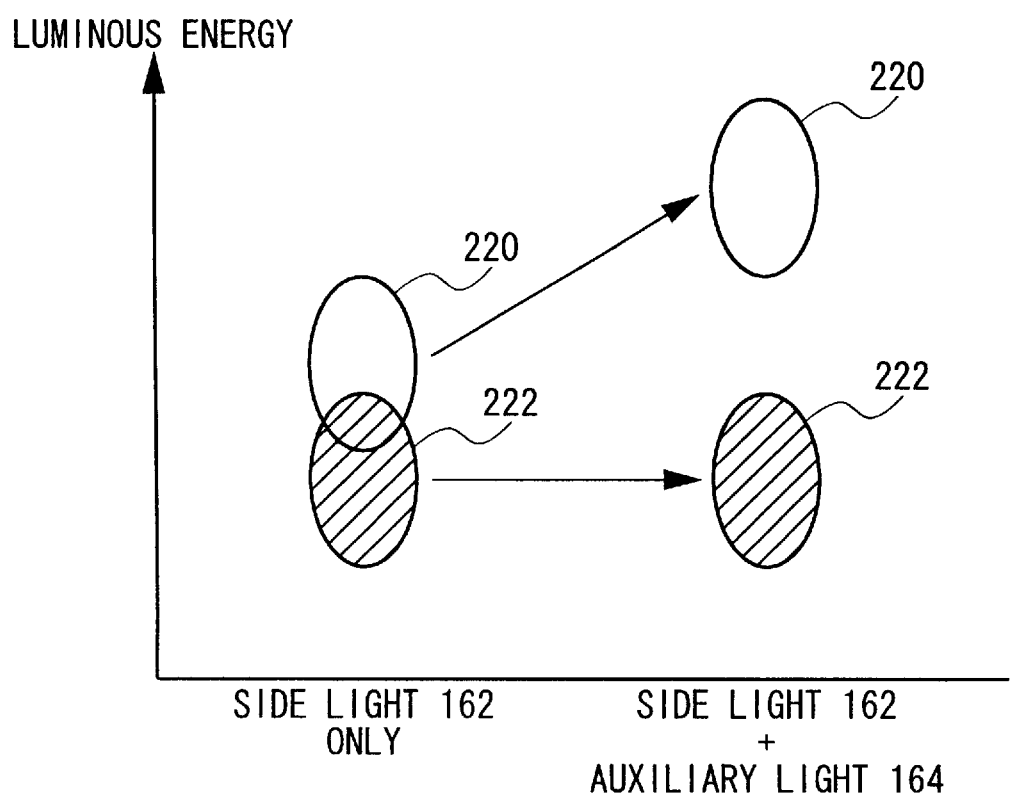
FIG. 14 illustrates a luminous energy to be detected in a side light test, on the residual flux and the solder bridge of FIG. 13.

Referring to FIG. 13 and FIG. 14, the significance of the auxiliary light 164 is explained. As shown in FIG. 13, consider a surface mount type of IC 200. After the implementation of the IC 200, there could be a residual solder flux 206, as simply referred to as "a residual flux" below, and a solder bridge 204, which is an implementation error, between pins 202 of the IC 200. The residual flux 206 often remains across the pins 202. Therefore, it is required to judge rightly only the solder bridge 204 as failure. This inspection is performed as one of the test items in the side light test.

FIG. 14 illustrates the luminous energy to be detected by the line sensor 34 in the side light test, on the residual flux 206 and the solder bridge 204. The range 222 of the luminous energy originating in the catoptric light from the residual flux 206, and the range 220 of the luminous energy originating in the catoptric light from the solder bridge 204 are comparatively close in the case of the side light 162 only, as shown in the figure. On the other hand, when the auxiliary light 164 is added to the side light 162, the range 222 of the luminous energy on the residual flux 206 shows almost no change, but the range 220 of the luminous energy on the solder bridge 204 shifts toward a larger value. This property, which is found by the inventor, increases the dynamic range for the inspection and enhances the accuracy in discriminating between the two. The second consideration in the embodiment as described so far is an important inspection technology in the recent implementation site where flux is rarely washed away.

Figure 15:
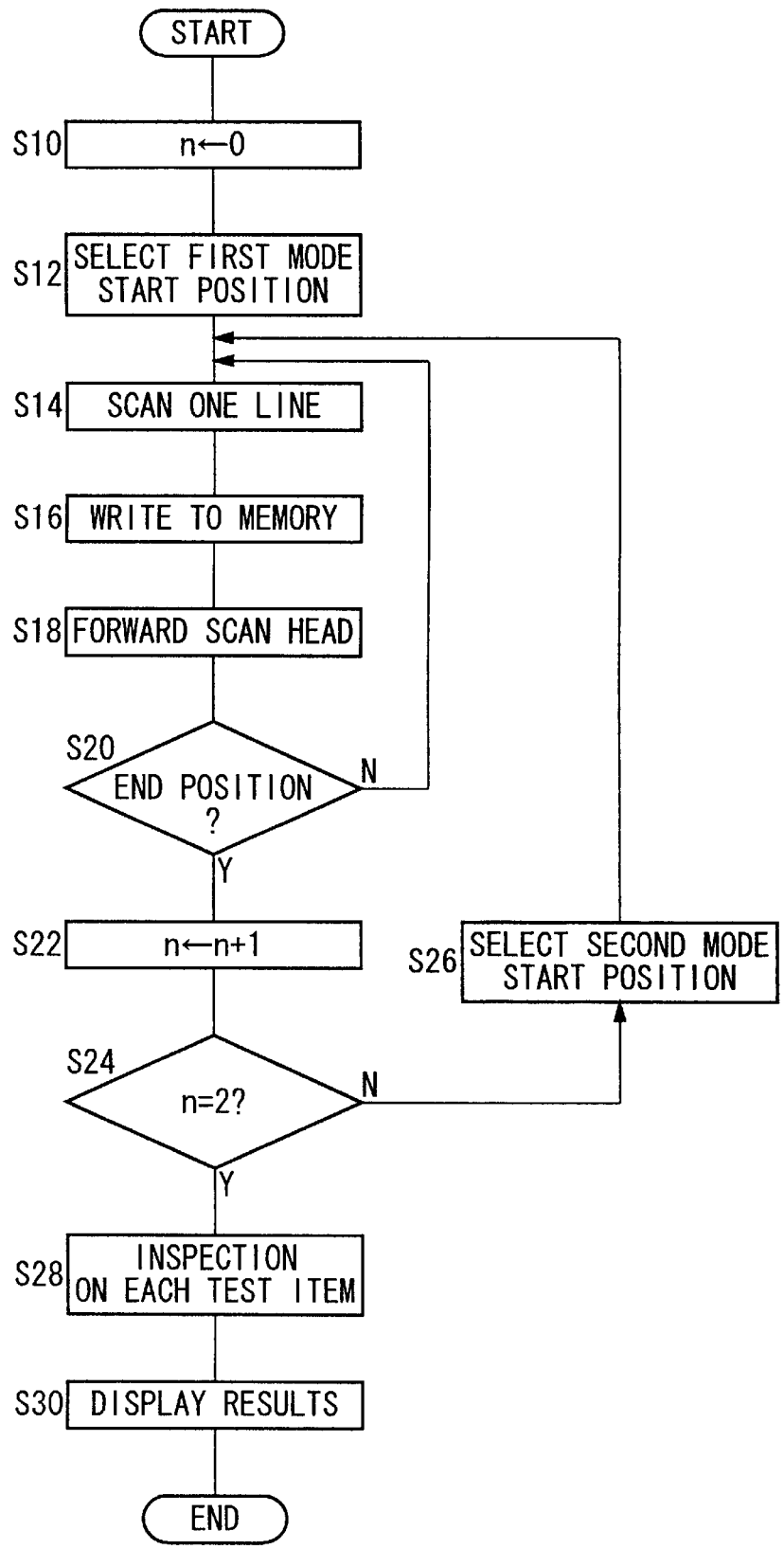
FIG. 15 is a flowchart showing a procedure by which a vertical light test and a side light test are performed separately.

FIG. 15 is a flowchart showing an inspection procedure by the appearance inspection apparatus 10 having the configuration as described above. First, an example is shown in which the whole image data of the substrate 1 is captured first in the vertical light test, and then the whole image data is likewise captured by the side light test, and finally the inspection is performed.

As shown in the figure, first the counter n that indicates the number of times of the image capturing is set to zero (S10), and the vertical light test mode is selected as the first mode, and then the scan head 16 is forwarded to the start position (S12). When the vertical light test mode is selected, by the head control unit 40, the vertical light source 100 is set to turn on and the side light source 102 is set to turn off.

Next, the line sensor 34 scans the first one line (S14), and its image data 54 is written to the memory 44 (S16). Then the scan head 16 is forwarded by one line in the driving direction by the head control unit 40 (S18), and it is judged whether the position is the end point of the scanning, that is the terminating edge on the substrate 1 according to the pre-input information regarding the substrate 1 (S20). As long as the position is not the end point (N of S20), scanning the line, writing to the memory 44, and forwarding the scan head 16 (S14, S16, and S18) is repeated, and then the whole image data of the substrate 1 is obtained.

When the whole image data of the substrate 1 is obtained, the scan head 16 reaches the end point (Y of S20), the counter n is incremented (S22), and it is judged whether this n is 2 or not. Now, since n is 1, the process forwards to S26, and the side light test mode is selected as the second mode, and then the scan head 16 returns to the start position (S26). When the side light test mode is selected, the central part of the vertical light source 100, that is the first zone, is set to turn off, and other regions in the vertical light source, namely the second zone is set to turn on, and the side light source 102 is set to turn on. Next, starting from the start position, scanning the line, writing to the memory 44, and forwarding the scan head 16 (S14, S16, S18) are repeated and finally the whole image data of the substrate 1 by the side light test is obtained. After the whole image is obtained, the scan head 16 reaches the end point (Y of S20), the counter n is incremented (S22). Since n is now 2, the process moves from Y of S24 to S28.

At S28, the inspection on each of test items is performed. The analysis unit 46 reads the image obtained in the vertical light test from the memory 44 and inspects on the vertical light test items, and then reads the image obtained in the side light test and inspects on the side light test items. The criteria for judging on pass or failure and other information are read from the judgment criteria storing unit 48 and the information are utilized. After the inspection, the results are displayed (S30) and the sequence of the process ends. Note that the results on pass or failure may be not only displayed but also written to the memory 44, or if all test items are passed, the results may not be displayed. Thus it can be understood by those skilled in the art that there might be various alterations in the operation. Also, it is allowable that first the side light test is performed as the first mode, and then the vertical light test follows as the second mode. It is a matter of course that the capturing the image data 54 and the inspection may be processed in parallel as long as it is possible.

Turning on the vertical light, and turning on the side light and the auxiliary light may be interleaved so that both of the images for the vertical light test and the side light test can be formed separately but at the same time, while the scan head 16 moves over the substrate 1 at only a single time. For this purpose, the image resolution should be high enough so that the inspection aim can be achieved even if each of the images is obtained at every two lines.

Figure 16:
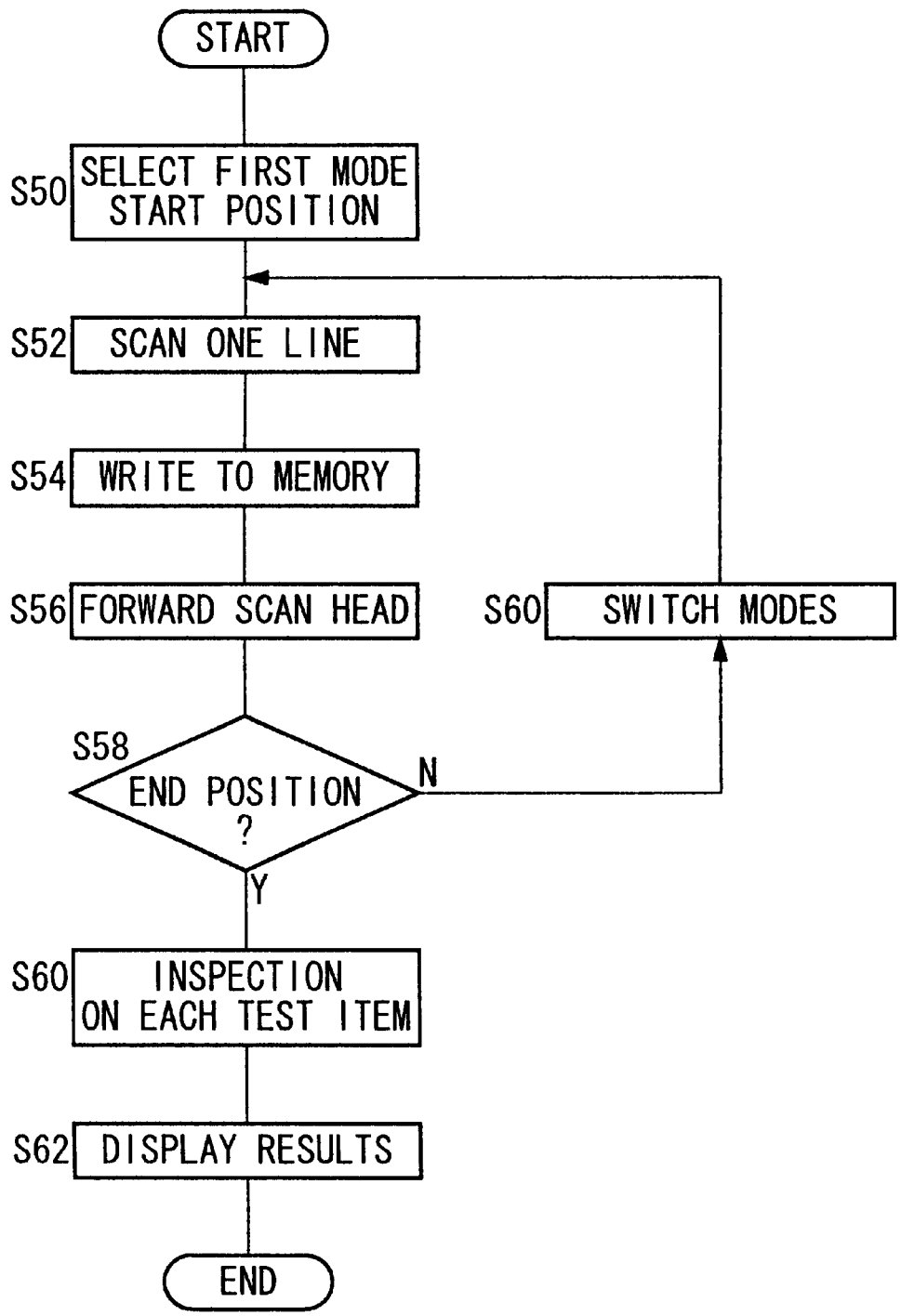
FIG. 16 is a flowchart showing a procedure by which a vertical light test and a side light test is interleaved and performed at one time.

FIG. 16 shows an inspection procedure in the interleaving method by which the odd lines including the first line are set for the vertical light test and the even lines are set for the side light test.

First, the vertical light test is selected as the first mode, and the scan head 16 is set to the start point (S50). Next, the first line is scanned (S52), and its image data 54 is written to the memory 44 (S54). The scan head 16 is forwarded by one line in the driving direction (S56) and it is judged whether the position is the end point of the scanning (S58). If it is not the end point (N of S58), the mode is switched to the side light test mode (S60), and under the side light and the auxiliary light, scanning the second line, writing to the memory 44, and forwarding the scan head 16 (S52, S54, S56) are processed. Until the scan head 16 reaches the end point, the processes from S52 to S60 are repeated, and the image on the odd lines is formed under the vertical light, while the image on the even lines is formed under the side light and the auxiliary light.

When the scan head 16 reaches the end point, the process moves from Y of S58 to S60, and the inspection on each of the test items (S60) and displaying the results (S62) are performed as it is in FIG. 15, and the sequence of the process ends.

According to the interleaving method, as a matter of course, the inspection time reduction is achieved. Furthermore, since the scan head 16 is forwarded at only a single time in the driving direction, it is advantageous for incorporating the appearance inspection apparatus 10 into the product manufacturing line. In this case, for instance, by fixing the scan head 16 and changing the sustaining board 22 for the substrate 1 to a conveyor, the substrate 1 under the manufacturing line can be inspected as it is.

Although the present invention has been described by way of exemplary embodiments, it should be understood that many changes and substitutions may be made by those skilled in the art without departing from the spirit and the scope of the present invention which is defined by the appended claims. Some of such alterations are stated as follows.

In the embodiment, the substrate 1 is considered as an object under inspection, but the appearance inspection apparatus 10 may not be restricted to this application. For instance, as well as the pin inspection in the BGA (Ball Grid Array) type of LSI, the apparatus can be widely applied to the inspection meaningful in the combination of the vertical light test and the side light test.

In the embodiment, two sets of the side light sources 102 are provided in parallel to the vertical light source 100, but three or four sets, or further more may be provided. For instance, in the case of four sets, new side light sources 102 may be provided around the edge of the long side of the side light source 102 in FIG. 5 so that the four sets of the side light sources 102 can be arranged surrounding the line under inspection. In any cases, it is generally preferable that more side light is secured.

In the embodiment, the shade material with black stripe shape is provided in a lenticular sheet 106, but it is not restricted to the configuration. Any other configuration may be possible as long as it works as a slit and the similar effect can be obtained. Likewise, the acrylic sheet 104 may be any other material with the diffusion effect.

In the embodiment, the vertical light source 100 and the side light source 102 are implemented by the LED series 120, but these light sources may be implemented by a fluorescent lamp or other means. However, when the light sources are used in the interleaving method, an element fast enough to switch between turn-on and turn-off should be generally used and the LED series 120 meets the requirement. In general, the LED series 120 are also considerably advantageous compared to the fluorescent lamps in respect to the lifetime.

In the embodiment, 6 rows and 4 rows of LED series 120 are provided respectively for the vertical light source 100 and the side light source 102, it does not intend to restrict to these figures. Generally, m rows of LED series 120 may be arranged in the scanning direction 110 both for the vertical light source 100 and the side light source 102, and the first zone may be formed by n (n<m) rows of the light emitting diodes near to the central, but any other configuration is allowable if it has a similar effect in the present invention.

In the embodiment, when the auxiliary light is projected, the region that projects the ideal vertical light, that is, the LED series 120 in the first zone is turned off. As another method, in the side light test, a shade material to intercept the light from the first zone may be inserted. Another method for realizing comparatively quick switch between transmitting and intercepting the light without the movement of the mechanics, for instance, an liquid crystal panel may be inserted and the transmittance of the part corresponding to the first zone may be controlled.

In the embodiment, the vertical light source 100 and the side light source 102 are separately configured, but may be configured as one unit. It is not necessary to provide some space between the vertical light source 100 and the side light source 102, and various designs can be made as long as the optical path can be secured from the half mirror 108 to the lens 32.

If it is not desirable that only the first zone in the vertical light source 100 is turned on under a different control, there might be a method in which the whole vertical light source 100 is weakly turned on in the side light test. "Weakly turned on" means to be turned on relatively darker compared to the brightness in the vertical light test. Particularly, when the width of the vertical light source 100 is large at a certain degree, turning on weakly is useful enough in many cases.

FIG. 4 illustrates the main unit 12 and the test unit 14 as an integrated device, but these units may exist in separated places. For instance, the test unit 14 may be incorporated into the manufacturing line in factories and the main unit 12 may be placed in different organizations such as an analysis center or others, which are connected with the test unit 14 via any networks. The test unit 14 may be placed on a user side and the main unit 12 may be placed on the analysis center, and thus a business model to undertake analysis work from the user can be possible.

What is claimed is:

1. A scan head for scanning an object under inspection, comprising:
    a vertical light source which projects light on a surface of the object from right above;
    a line sensor which detects catoptric light that reflects vertically upward on the surface; and
    a lenticular sheet which is inserted between said vertical light source and the object and has a lens surface and a non-lens surface, wherein said lenticular sheet is arranged in a manner such that said lens surface faces to the object and a direction of lens gouges in said lens surface and a scanning direction in said line sensor are nearly orthogonal.

2. A scan head as in claim 1, wherein said lenticular sheet has a shade material with a line shape attached to said non-lens surface, said shade material being in a position at an opposite side corresponding to each of said lens gouges.

3. A scan head as in claim 1, further comprising a side light source which projects light sidelong on the object, and said vertical light source and said side light source are configured in such a manner of being enabled to turn on selectively.

4. A scan head as in claim 1, wherein said vertical light source is arranged with a predefined width along a scanning direction in said line sensor vertically right above the surface under inspection, and is so configured that a first zone that passes through a central part of said width and a second zone excluding the first zone are enabled to turn on independently.

5. A scan head for scanning an object under inspection, comprising:
a vertical light source which projects light on a surface of the object from right above;
a line sensor which detects catoptric light that reflects vertically upward on the surface; and
a lenticular sheet which is inserted between said vertical light source and the object and has a lens surface and a non-lens surface,
wherein said lenticular sheet is arranged in a manner such that said lens surface faces to the object and a direction of lens gouges in said lens surface and a scanning direction in said line sensor are nearly orthogonal; and
said non-lens surface has a shade material which functions as a slit for incident light to restrain a diffusion of light projected on the object.

6. A scan head as in claim 5, further comprising a side light source which projects light sidelong on the object, and said vertical light source and said side light source are configured in such a manner of being enabled to turn on selectively.

7. A scan head as in claim 5, wherein said vertical light source is arranged with a predefined width along a scanning direction in said line sensor vertically right above the surface under inspection, and is so configured that a first zone that passes through a central part of said width and a second zone excluding the first zone are enabled to turn on independently.

8. A scan head for scanning an object under inspection, comprising:
a vertical light source which projects light on a surface of the object from right above;
a line sensor which detects catoptric light that reflects vertically upward on the surface; and
a lenticular sheet which is inserted between said vertical light source and the object and has a main lens surface and a sub lens surface,
wherein said main lens surface is configured in a manner such that said main lens surface faces to the object and a direction of lens gouges in said main lens surface and a scanning direction in said line sensor are nearly orthogonal;
said sub lens surface faces to said vertical light source and is so configured that each of lens forming said sub lens surface is in a position at an opposite side corresponding to each of lens forming said main lens surface; and
said sub lens surface has a shade material with a line shape attached to a lens boundary at an opposite side corresponding to each of said lens gouges in said main lens surface.

9. A scan head as in claim 8, further comprising a side light source which projects light sidelong on the object, and said vertical light source and said side light source are configured in such a manner of being enabled to turn on selectively.

10. A scan head as in claim 8, wherein said vertical light source is arranged with a predefined width along a scanning direction in said line sensor vertically right above the surface under inspection, and is so configured that a first zone that passes through a central part of said width and a second zone excluding the first zone are enabled to turn on independently.

11. An apparatus for inspecting appearance of an object under inspection, comprising:
a scan head which scans the object; and
a main unit which synthetically controls said apparatus including said scan head;
wherein said scan head includes:
a vertical light source which projects light on a surface of the object from right above;
a line sensor which detects catoptric light that reflects vertically upward on the surface and generates image data; and
a lenticular sheet which is inserted between said vertical light source and the object and has a lens surface and a non-lens surface, said lens surface facing to the object and said non-lens surface having a shade material which functions as a slit for incident light to restrain a diffusion of light projected on the object, and
said main unit includes:
a head control unit which controls a relative movement of said scan head and the object; and
an analysis unit which judges on pass or failure for each of test items by examining the image data with predefined judgment criteria.

12. A scan head for scanning an object under inspection, comprising:
a line sensor which detects catoptric light that reflects vertically upward on a surface of the object;
a vertical light source which is arranged with a predefined width vertically right above the surface along a scanning direction in said line sensor,
a lenticular sheet which is inserted between said vertical light source and the object and has a lens surface provided with lens gouges and non-lens surface, and said lenticular sheet is arranged in a manner such that said lens surface faces to the object and a direction of said lens gouges and a scanning direction in said line sensor are nearly orthogonal; and
a side light source which is arranged sidelong above the surface along the scanning direction in said line sensor and
wherein said vertical light source is so configured that a first zone that passes through a central part of said width and a second zone excluding the first zone are enabled to turn on independently.

13. A scan head as in claim 12, wherein said first zone is an ideal region in a vertical light test where an intension of the catoptric light by lighting from said first zone is within close to maximum.

14. A scan head as in claim 12, wherein said vertical light source includes m rows of light emitting diode series that is arranged along said scanning direction and said first zone is formed by n (n<m) rows of said light emitting diode series near to the central part.

15. An apparatus for inspecting appearance of an object under inspection, comprising:

a scan head which scans the object; and a main unit which synthetically controls said apparatus including said scan head;

wherein said scan head includes:

a line sensor which detects catoptric light that reflects vertically upward on a surface of the object and generates image data;

a vertical light source which is arranged with a predefined width vertically right above the surface along a scanning direction in said line sensor, and a lenticular sheet which is inserted between said vertical light source and the object and has a lens surface provided with lens gouges and non-lens surface, and said lenticular sheet is arranged in a manner such that said lens surface faces to the object and a direction of said lens gouges and a scanning direction in said line sensor are nearly orthogonal; and a side light source which is arranged sidelong above the surface along the scanning direction in said line sensor, and wherein said vertical light source is so configured that a first zone that passes though a central part of said width and a second zone excluding the first zone are enabled to turn on independently, and said main unit includes:

a head control unit which controls lighting in said scan head and a relative movement of said scan head and the object;

a memory control unit which controls storing said image data into a memory and an analysis unit which judges on pass or failure for each of test items by examining the image data stored in the memory with predefined judgement criteria.

16. An apparatus as in claim 15, wherein said head control unit sets said vertical light source to turn on in a first test mode, while setting said side light source to turn on in a second test mode, and said vertical light source to turn on weakly in a second test mode.

17. An apparatus as in claim 15, wherein said head control unit sets said vertical light source to turn on in a first test mode, while setting said side light source and said second zone in said vertical light source to turn on in a second test mode, and said first zone to turn off in a second test mode.

18. An apparatus as in claim 15, wherein by interleaving said first test mode and said second test mode, said head control unit switches repeatedly between turning on and off said vertical light source and said side light source, and wherein by interleaving writing the image data to the memory, said memory control unit forms image data to be obtained in said first test mode and image data to be obtained in said second test mode separately in the memory.

19. A method for inspecting appearance of an object under inspection, comprising:

selecting a first test mode;

projecting vertical light on a surface of the object from a vertical light source which is arranged vertically right above the surface and scanning said surface line by line;

detecting catoptric light that reflects vertically upward on the surface and generating image data of the surface line by line during the scanning in the first test mode;

selecting a second test mode;

projecting simultaneously side light from a side light source which is arranged sidelong above the surface, and auxiliary light provided by turning on a zone excluding a central part of said vertical light source and scanning the surface line by line in the second test mode; and detecting catoptric light that reflects vertically upward on the surface and generating image data of the surface line by line during the scanning in the second test mode.

20. A method as in claim 19, wherein scanning in the first test mode includes adjusting a direction of said vertical light through a lenticular sheet that is arranged in a manner such that a lens surface faces to the object and a direction of lens gouges in said lens surface and a scanning direction are nearly orthogonal.

21. A method as in claim 19, wherein said first test mode and said second test mode are interleaved and the image data in the first test mode and the image data in the second test mode are formed at a single scan.

* * * * *